(12) United States Patent
Zhou et al.

(10) Patent No.: US 11,853,781 B2
(45) Date of Patent: Dec. 26, 2023

(54) INTER-APPLICATION RELEVANCE MANAGEMENT FOR APPLICATION VIRTUALIZATION PLATFORM

(71) Applicant: CITRIX SYSTEMS, INC., Fort Lauderdale, FL (US)

(72) Inventors: Fuping Zhou, Nanjing (CN); Nicky Shi, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/732,783

(22) Filed: Apr. 29, 2022

(65) Prior Publication Data

US 2022/0253326 A1 Aug. 11, 2022

Related U.S. Application Data

(63) Continuation of application No. 16/842,042, filed on Apr. 7, 2020, now Pat. No. 11,347,528, which is a continuation of application No. PCT/CN2020/080803, filed on Mar. 24, 2020.

(51) Int. Cl.
  *G06F 9/455* (2018.01)
  *G06F 9/50* (2006.01)
  *G06F 9/54* (2006.01)
  *G06Q 10/0631* (2023.01)
  *G06F 8/60* (2018.01)

(52) U.S. Cl.
  CPC ........... *G06F 9/45516* (2013.01); *G06F 8/60* (2013.01); *G06F 9/45558* (2013.01); *G06F 9/5005* (2013.01); *G06F 9/5077* (2013.01); *G06F 9/54* (2013.01); *G06Q 10/06315* (2013.01)

(58) Field of Classification Search
  None
  See application file for complete search history.

(56) References Cited

U.S. PATENT DOCUMENTS 6,249,800 B1 * 6/2001 Aman ................. H04L 67/1012
  709/239
6,718,535 B1 * 4/2004 Underwood ............ G06F 9/451
  717/101

(Continued)

FOREIGN PATENT DOCUMENTS

| CN | 103905466 A | 7/2014 |
| CN | 108540556 A | 9/2019 |

(Continued)

OTHER PUBLICATIONS

International Search Report and Written Opinion dated Dec. 21, 2020 for PCT/CN2020/080803 filed Mar. 24, 2020; pp. 9.

*Primary Examiner* — Abu Zar Ghaffari

(57) ABSTRACT

A system and method that provides inter-application relevance management for resources being brokered by an application virtualization platform. A described platform includes a memory configured to store a set of relevance rules for applications hosted by the application virtualization platform, wherein each relevance rule specifies a relevance setting between a first application and a second application. Also included is a processor coupled to the memory and configured to broker resources for the application virtualization platform to avoid conflict between the applications.

18 Claims, 6 Drawing Sheets

(56) References Cited

U.S. PATENT DOCUMENTS

| | | | |
|---|---|---|---|
| 7,383,541 B1 | 6/2008 | Banks | G06F 8/65 717/126 |
| 9,838,505 B2 | 12/2017 | Jolfaei | H04L 67/142 |
| 10,412,091 B2 | 9/2019 | Mitevski | H04L 63/10 |
| 10,671,035 B2 | 6/2020 | Feiten | G05B 19/41865 |
| 2004/0006625 A1 | 1/2004 | Saha | G06F 16/24539 709/227 |
| 2004/0034707 A1 | 2/2004 | Royer | H04L 67/14 709/227 |
| 2005/0021771 A1 | 1/2005 | Kaehn | H04L 67/14 709/228 |
| 2009/0204687 A1 | 8/2009 | Ito | G06F 9/54 709/218 |
| 2010/0306773 A1 | 12/2010 | Lee | G06F 9/5077 718/1 |
| 2012/0246318 A1 | 9/2012 | Mohammed | G06F 9/5061 709/226 |
| 2012/0254660 A1 | 10/2012 | He | G06F 11/3688 714/28 |
| 2013/0066952 A1 | 3/2013 | Colrain | G06F 11/1438 709/203 |
| 2013/0080641 A1 | 3/2013 | Lui | H04L 43/045 709/226 |
| 2014/0040343 A1* | 2/2014 | Nickolov | H04L 69/32 709/201 |
| 2014/0040975 A1 | 2/2014 | Raleigh | G06Q 30/016 726/1 |
| 2014/0223011 A1* | 8/2014 | Smith | H04L 67/142 709/226 |
| 2015/0127774 A1 | 5/2015 | Hitomi | G06F 21/105 709/219 |
| 2015/0143395 A1* | 5/2015 | Reisman | H04N 21/4358 725/14 |
| 2015/0324277 A1 | 11/2015 | Dolinsky | G06F 9/4411 714/38.1 |
| 2016/0070922 A1 | 3/2016 | Achutha | G06F 21/6218 726/1 |
| 2017/0019485 A1 | 1/2017 | Dorr | H04L 67/10 |
| 2017/0308367 A1 | 10/2017 | Clothier | G06F 9/44536 |
| 2018/0260258 A1 | 9/2018 | Wester | G06F 9/548 |
| 2019/0052584 A1 | 2/2019 | Barve | G06Q 30/016 |
| 2019/0097995 A1* | 3/2019 | Chickering | H04L 67/146 |
| 2019/0205529 A1 | 7/2019 | Schaefer | G06F 21/6281 |
| 2020/0065092 A1 | 2/2020 | Harter | H04W 4/44 |
| 2020/0328930 A1 | 10/2020 | Hillier | H04L 41/022 |

FOREIGN PATENT DOCUMENTS

| | | |
|---|---|---|
| EP | 2428894 A1 | 3/2012 |
| WO | 2014084967 A1 | 6/2014 |

\* cited by examiner

| Rule_id | App_id #1 | App_id #2 | Relevance | Scope |
|---|---|---|---|---|
| 1 | BC_peruser_frontline_01 | BC_peruser_backend_01 | R_samesession | S_currentuser |
| 2 | BC_peruser_frontline_01 | BC_alluser_backend_01 | R_sameserver | S_alluser |
| 3 | BC_singleInstPerSession_01 | BC_singleInstPerSession_01 | R_notsameSession | S_currentuser |
| 4 | BC_singleInstPerVM_01 | BC_singleInstPerVM_01 | R_notsameserver | S_alluser |
| ... | ... | ... | ... | ... |

Figure 2

INTER-APPLICATION RELEVANCE MANAGEMENT FOR APPLICATION VIRTUALIZATION PLATFORM

PRIORITY CLAIM

This continuation application claims priority to patent application Ser. No. 16/842,042 filed on Apr. 7, 2020, the entire contents of which are hereby incorporated by reference.

BACKGROUND OF THE DISCLOSURE

In a typical application virtualization platform, users log into a virtual workspace via remote clients to access virtual applications and services. Once logged in, users can submit a request via the client to have the platform launch an application, such as a browser, email service, word processor, etc., that will be virtualized via the client for used. In response to the request, the platform utilizes a brokering system to identify resources (e.g., a session, a server, etc.,) for running the application for an end user.

BRIEF DESCRIPTION OF THE DISCLOSURE

Aspects of this disclosure provide a system and method that provides inter-application relevance management for resources being brokered by an application virtualization platform.

A first aspect of the disclosure provides an application virtualization platform. The platform includes a memory configured to store a set of relevance rules for applications hosted by the application virtualization platform, wherein each relevance rule specifies a relevance setting between a first application and a second application. The platform also includes a processor coupled to the memory and configured to broker resources for the application virtualization platform, according to a method. The method includes receiving a request from a client to launch a target application hosted by the application virtualization platform; retrieving a subset of applicable relevance rules that specify the target application from the set of relevance rules; and selecting a resource for the target application based on the subset of applicable relevance rules, wherein the resource includes at least one of a session or a session host.

A second aspect of the disclosure provides a brokering system that includes a memory and a processor coupled to the memory and configured to broker resources for an application virtualization platform, according to a method. The method includes receiving a request from a client to launch a target application hosted by the application virtualization platform; retrieving a subset of applicable relevance rules that specify the target application from a set of relevance rules, wherein each relevance rule specifies a relevance setting between a first application and a second application; and selecting a resource for the target application based on the subset of applicable relevance rules, wherein the resource includes at least one of a session or a session host.

A third aspect of the disclosure provides method for brokering resources for an application virtualization platform. The method includes receiving a request from a client to launch a target application hosted by the application virtualization platform; retrieving a subset of applicable relevance rules that specify the target application from a set of relevance rules, wherein each relevance rule specifies a relevance setting between a first application and a second application; and selecting a resource for the target application based on the subset of applicable relevance rules, wherein the resource includes at least one of a session or a session host.

A fourth aspect of the disclosure includes an application virtualization platform, including: a memory configured to store a set of relevance rules for applications hosted by the application virtualization platform, wherein each relevance rule identifies at least two distinct applications and specifies a relevance setting between the at least two applications, wherein the at least two applications include a first application and a second application, and wherein the relevance setting defines whether the first application and the second application are compatible to run on a same session, or a same session server; and a processor coupled to the memory and configured to apply the set of relevance rules for applications hosted by the application virtualization platform to avoid conflict between the at least two applications, according to a method including: receiving a request from a client to launch a target application hosted by the application virtualization platform; retrieving a subset of applicable relevance rules that specify the target application from the set of relevance rules; and selecting a resource for the target application based on the subset of applicable relevance rules, wherein the resource includes at least one of a session or a session server, wherein selecting the resource includes: i) defining a first candidate set of sessions for the target application to join that have a currently running application for which the subset of relevance rules define as eligible for the target application to join on the same session, ii) searching for all currently running applications that are not compatible to run on the same session as the target application and defining a second candidate set of sessions that include the currently running applications that are not compatible to run on the same session as the target application, and iii) returning only sessions from the first candidate set of sessions that do not include the second candidate set of sessions for the target application to join, if step (iii) does not return any eligible sessions for the target application to join, then: iv) defining a first candidate set of session servers for the target application to join that have a currently running application for which the subset of relevance rules define as eligible for the target application to join on the same session server, v) searching for all currently running applications that are not compatible to run on the same session server as the target application and defining a second candidate set of session servers that include the currently running applications that are not compatible to run on the same session server as the target application, and vi) returning only session servers from the first candidate set of session servers that do not include the second candidate set of session servers for the target application to join.

A fifth aspect of the disclosure includes a method for brokering resources for an application virtualization platform, the method including: receiving a request from a client to launch a target application hosted by the application virtualization platform; retrieving a subset of applicable relevance rules that specify the target application from a set of relevance rules, wherein each relevance rule specifies a relevance setting between a first application and a second application defining whether the first application and the second application are compatible to run on a same session, or a same session server; and selecting a resource for the target application based on the subset of applicable relevance rules to avoid conflict between the at least two applications, wherein the resource includes at least one of a session or a session server, wherein selecting the resource for the target application includes: i) defining a first candidate set of sessions for the target application to join that have a currently running application for which the subset of relevance rules define as eligible for the target application to join on the same session, ii) searching for all currently running applications that are not compatible to run on the same session as the target application and defining a second candidate set of sessions that include the currently running applications that are not compatible to run on the same session as the target application, and iii) returning only sessions from the first candidate set of sessions that do not include the second candidate set of sessions for the target application to join, if step (iii) does not return any eligible sessions for the target application to join, then: iv) defining a first candidate set of session servers for the target application to join that have a currently running application for which the subset of relevance rules define as eligible for the target application to join on the same session server, v) searching for all currently running applications that are not compatible to run on the same session server as the target application and defining a second candidate set of session servers that include the currently running applications that are not compatible to run on the same session server as the target application, and vi) returning only session servers from the first candidate set of session servers that do not include the second candidate set of session servers for the target application to join.

A sixth aspect of the disclosure provide a method for brokering resources for an application virtualization platform, including: receiving a request from a client to launch a target application hosted by the application virtualization platform; retrieving a subset of applicable relevance rules that specify the target application from a set of relevance rules, wherein each relevance rule specifies a relevance setting between a first application and a second application defining whether the first application and the second application are compatible to run on a same session, or a same session server; and selecting a resource for the target application based on the subset of applicable relevance rules to avoid conflict between the at least two applications, wherein the resource includes at least one of a session or a session server, wherein selecting the resource for the target application includes: i) defining a first candidate set of sessions for the target application to join that have a currently running application for which the subset of relevance rules define as eligible for the target application to join on the same session, ii) searching for all currently running applications that are not compatible to run on the same session as the target application and defining a second candidate set of sessions that include the currently running applications that are not compatible to run on the same session as the target application, and iii) returning only sessions from the first candidate set of sessions that do not include the second candidate set of sessions for the target application to join, if step (iii) does not return any eligible sessions for the target application to join, then: iv) defining a first candidate set of session servers for the target application to join that have a currently running application for which the subset of relevance rules define as eligible for the target application to join on the same session server, v) searching for all currently running applications that are not compatible to run on the same session server as the target application and defining a second candidate set of session servers that include the currently running applications that are not compatible to run on the same session server as the target application, and vi) returning only session servers from the first candidate set of session servers that do not include the second candidate set of session servers for the target application to join.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 depicts a set of relevance rules, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for brokering resources (e.g., machines, servers, sessions, etc.) for requested applications in an application virtualization platform ("platform"), and more particularly, for providing inter-application relevance management when brokering such resources. Many applications have some explicit or implicit relevance between one another, such as a dependency or conflict. Any number of reasons may give rise to such a dependency or conflict. For example, dependent applications may rely heavily on network communication with each other. Conversely, conflicting applications may include applications that cannot be launched as multiple instances from a single session or single machine. In prior brokering solutions, applications were managed independently, and any such inter-application relevance was ignored. The present solution evaluates any inter-application relevance so that launched applications can be hosted at an appropriate "distance" from other running applications, i.e., using the same or different session, server, machine, data center, etc.

Utilizing this approach, hosted applications can be selectively grouped to run to closer together or apart as part of the brokering process. Thus, for example, applications that communicate often with each other can be located close to one another to reduce communication costs. Conversely, applications that conflict with one another, e.g., for security reasons, can be scheduled in different sessions or machines to avoid inter-application conflicts. The present approach provides a technical solution in which dependencies between applications are specified with a set of relevance rules. At the time of brokering, the relevance rules are evaluated as part of the load balance considerations to determine how applications should be hosted to ensure that certain applications function at an optimal distance.

Figure 1:
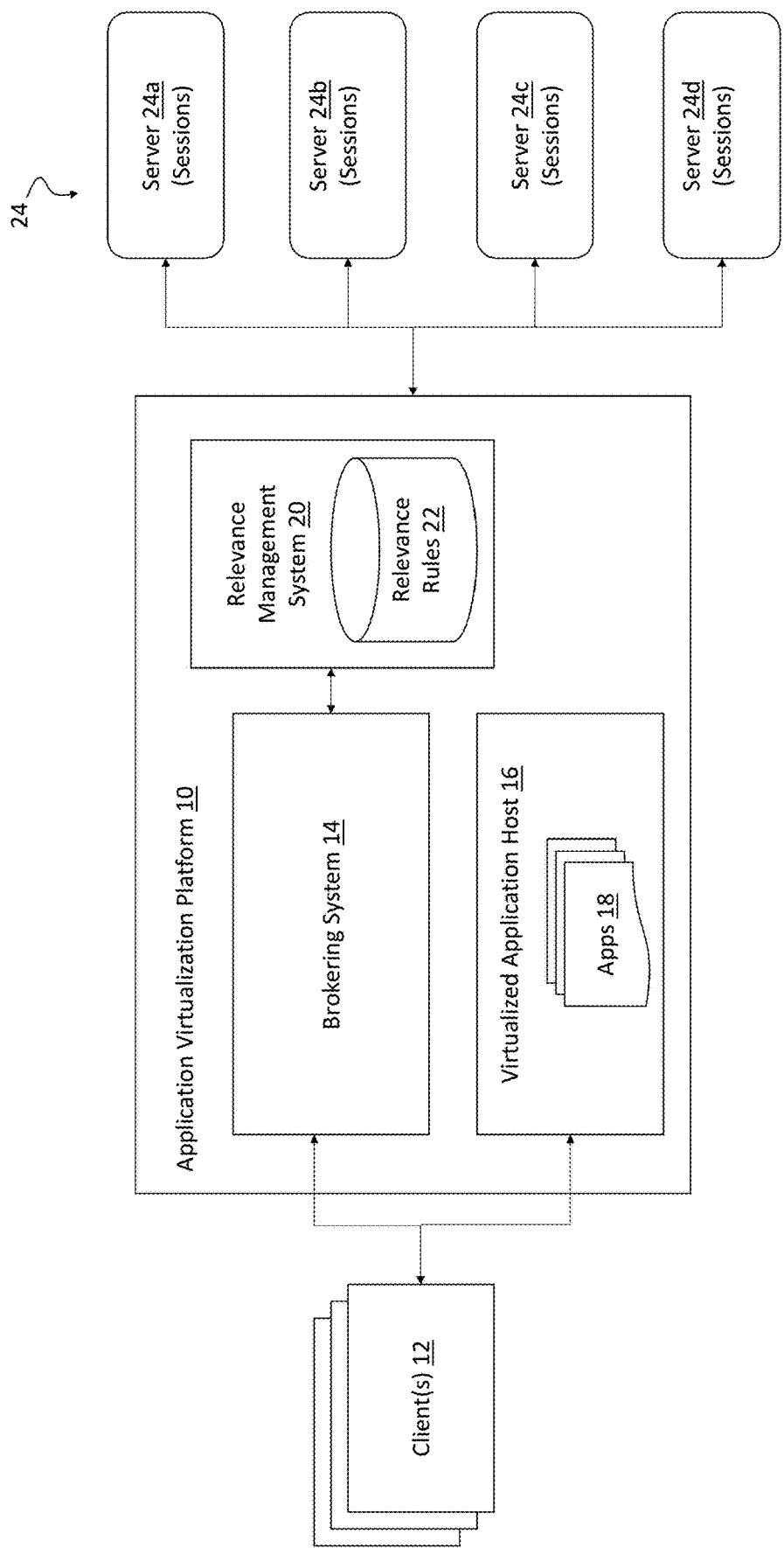
FIG. 1 depicts an illustrative application virtualization platform in accordance with an illustrative embodiment.

FIG. 1 depicts an illustrative workspace environment that generally includes a set of clients 12 that generally include endpoint computing devices, e.g., desktops, laptops, smart devices, etc., that run virtualization client applications to engage with an application virtualization platform 10. As noted, users access the platform 10 through via the endpoint computing devices that are configured to provide users with access to virtual resources, such as virtual applications, virtual desktops, and virtual servers that are hosted by computing devices physically distinct from the endpoint devices (e.g., as provided by Citrix® Workspace or the Citrix® Receiver, both of which are commercially available from Citrix Systems of Fort Lauderdale, Florida in the United States).

In the illustrative embodiment shown in FIG. 1, a virtualized application host 16 provides a set of applications (Apps) 18 accessible via clients 12. When a user submits a request to launch an application 18, brokering system 14 determines a hosting option 24 to host the application. Namely, broker system 14 determines whether an existing or new session should be utilized, which server 24a, 24b, 24c, 24d to use, etc. Servers 24 may for example be implemented in any manner, e.g., in a data center, a public or private cloud, a server farm, etc.

A relevance management system 20 interacts with the brokering system 14 to enhance the brokering process by evaluating inter-application relevance rules 22 when an application 18 is requested to be launched. Relevance rules 22 may for example be generated by system administrator or other service that has knowledge of the virtual workspace and associated applications 18. For example, it may be known that certain applications cannot run on the same server due to security concerns or that certain applications share data so it would be ideal to host them close together. An illustrative set of relevance rules 22 are shown in FIG. 2. Each rule includes a rule identifier (Rule_id), a pair of applications (App_id_#1 and App_id_#2), a relevance, and a scope. In an illustrative embodiment, the relevance between a pair of applications is selected from the following set:

```
Relevance_set{
R_samesession,  // this illustrates the application pair should be hosted in the same session
R_sameserver,   // this illustrates the application pair should be hosted in the same server
R_notsamesession,// this illustrates the application pair should not to be started in the same session
R_notsameserver, // this illustrates the application pair should not to be hosted in the same server
}.
```

Accordingly, in the example shown in FIG. 2 application pair BC_peruser_frontline_01 and BC_peruser_backend_01 should be hosted in the same session (rule_id 1), whereas application pair BC_singleInstPerSession_01 and BC_singleInstPerSession_01 should not be hosted in the same session (rule_id 3). Further, application pair BC_peruser_frontline_01 and BC_alluser_backend_01 should be hosted on the same server (rule_id 2), whereas application pair BC_singleInstPerVM_01 and BC_singleInstPerVM_01 should not be hosted on the same server (rule_id 4).

Furthermore, each rule has an associated scope that dictates the scope of the rule. In an illustrative embodiment, the scope is elected from the following set:

```
Scope_set
{
  S_currentuser  // this illustrates the relevance applies only for apps started by current user
  S_alluser     // this illustrates the relevance applies for apps started by all users
}.
```

In this rule set example, a relevance rule for an application pair can apply to the current user or all users. Accordingly, rule_id 1 applies only to the current user, whereas rule_id 2 applies to all users. Other user groups could likewise be defined and implemented.

Figure 3:
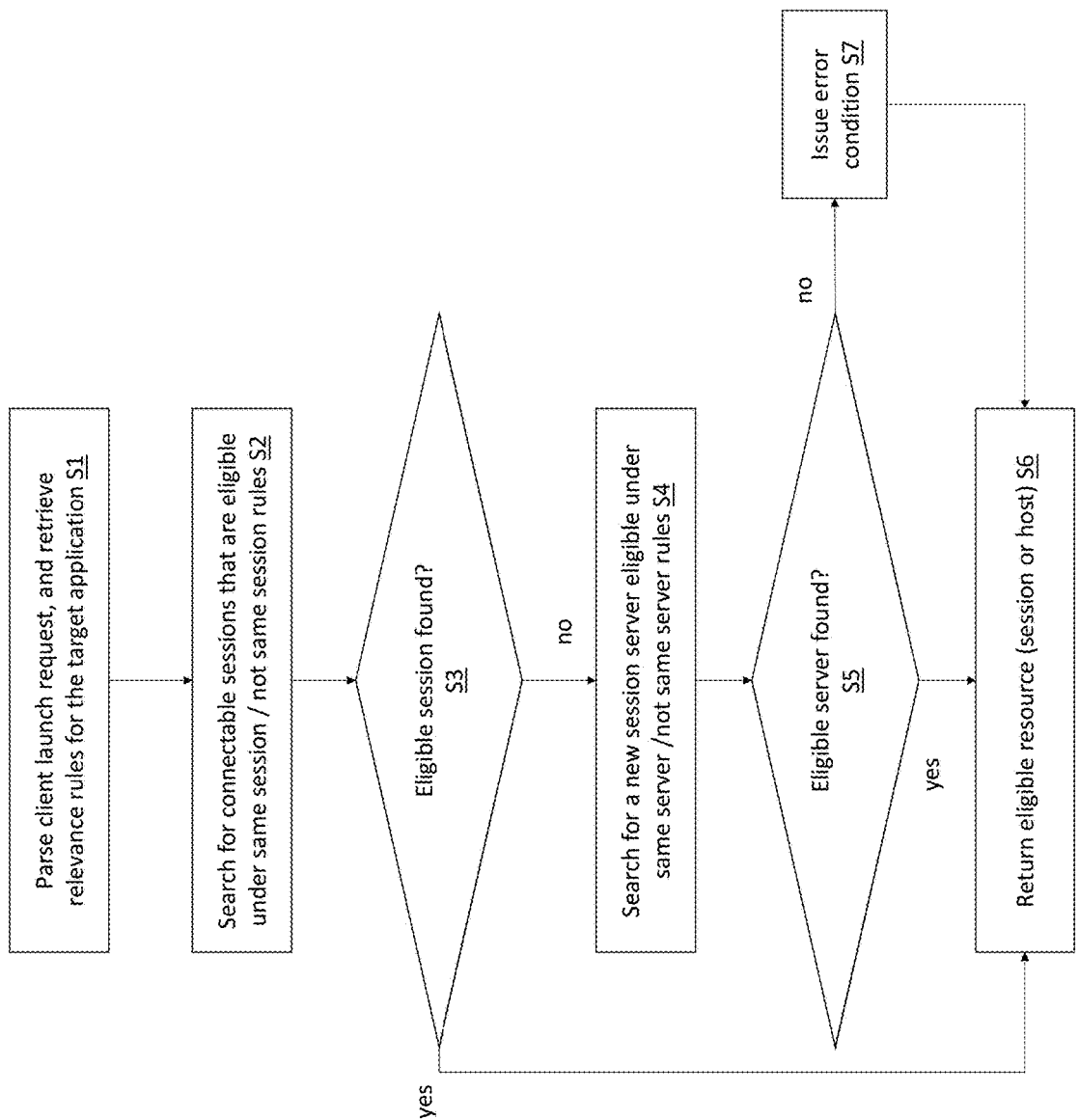
FIG. 3 depicts a flow diagram of a process for providing inter-application relevance management, in accordance with an illustrative embodiment.

FIG. 3 depicts a flow diagram of a process for implementing relevance manage system 20 when brokering resources. At S1, a received launch request for a target application is parsed and any relevance rules that include the target application are retrieved. At S2, connectable sessions are identified that are eligible under the same session/not same session rules. In this case, each relevance rule that includes the target application is analyzed and if one or more applications relevant to the target application are already running, a determination is made whether there exists an eligible session that the target application can utilize. For example, a first detected rule might specify that the target application should join an existing session used by a second application. However, a further rule might specify that the target application should not join the same existing session used by a third application. In this case, there would be no eligible session.

At S3, the determination is made whether an eligible session is found. If yes, then the eligible session is returned to the brokering system at S6. If no, then a new session server is searched for at S4 that is eligible under same server/not same server rules. In this case, each relevance rule that includes the target application is analyzed and if one or more applications relevant to the target application are already running, a determination is made whether there exists an eligible server that the target application can utilize. For example, a first detected rule might specify that the target application should join an existing server used by a second application. However, a further rule might specify that the target application should not join the same existing server used by a third application. In this case, some other server should be utilized. Assuming that an eligible server is located at S5, the eligible server is returned to the brokering system 20 at S6. If no eligible server is located, a failure condition can be generated at S7 and returned to the brokering system 20 at S6.

The following steps provide a detailed process for searching for an eligible session at S2 from a candidate session list that meets the relevance rules.

1: Find all R_samesession rules for the target application being launched, extracting the compatible applications from the relevance rules 22;

2: Find sessions from given session list that have the compatible applications hosted, save them into set #1;

3: Find all R_notsamesession rules for the target application being launched, extracting the incompatible applications from the rules;

4: Find candidate sessions from set #1 not having incompatible applications hosted;

5: If any sessions are found in step #4, then return the session;

6: Find sessions from given session list not having the compatible apps hosted, and save them into set #2;

7: Find candidate sessions from set #2 not having incompatible applications hosted;

8: If any sessions are found from step #7, then return the session.

The following steps provide a detailed process for searching for an eligible server at S4 from a candidate server list that meets the relevance rules.

1: Find all R_sameserver rules for the target application being launched, extracting the compatible applications from the relevance rules;

2: Find session servers from given list that having the compatible applications hosted, save them into set #1;

3: Find all R_notsameserver rules for the target application being launched, extract the incompatible applications from the relevance rules;

4: Find session servers from set #1 not having incompatible applications hosted for the specified rule scope;

5: If any session server is found in step #4, then return the session server;

6: Find session servers from given list not having compatible applications hosted, save them into set #2;

7: Find candidate session servers from set #2 not having incompatible applications hosted;

8: If any session server is found from step #7, then return the session server.

Figure 4:
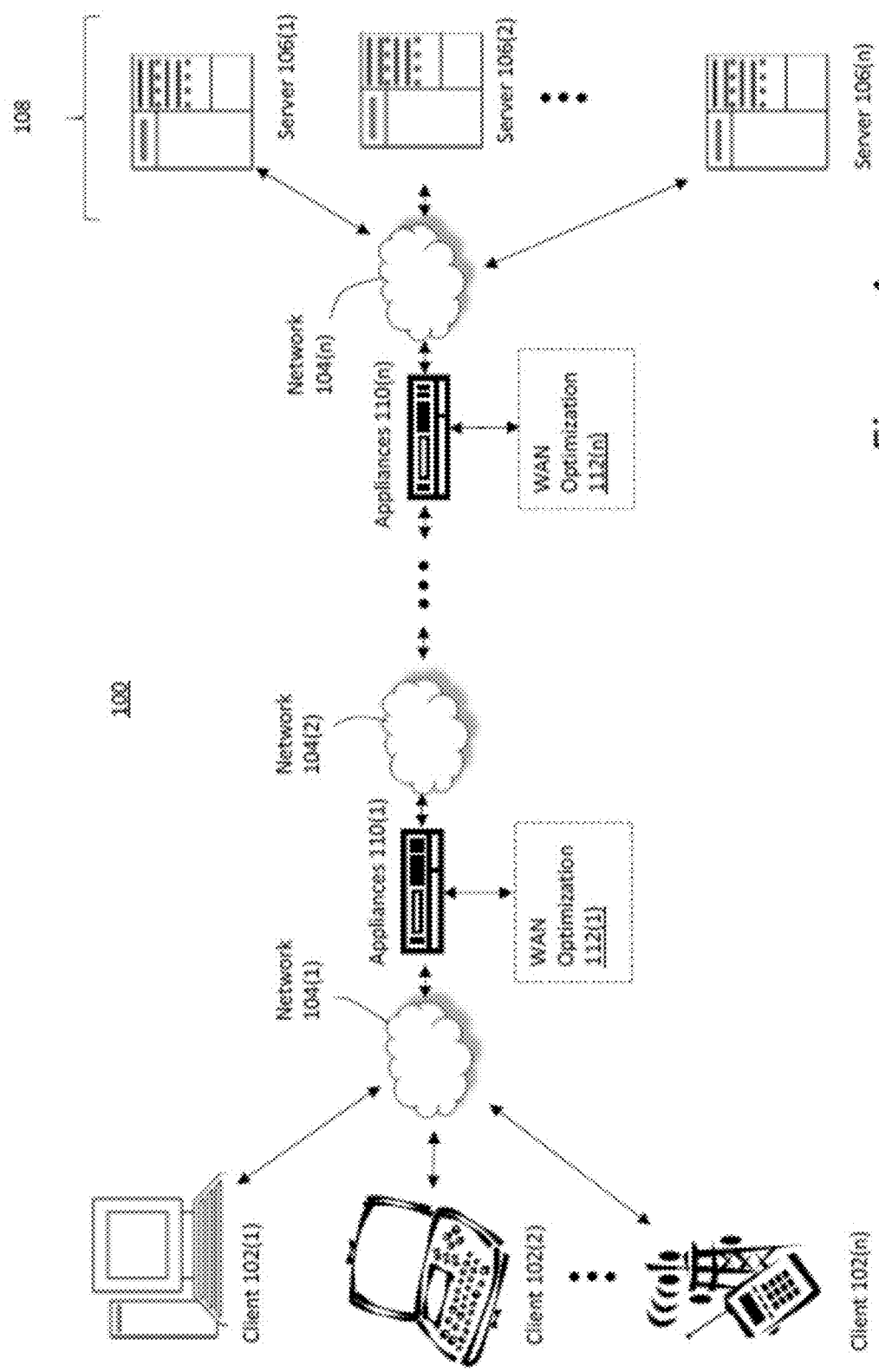
FIG. 4 depicts a network infrastructure, in accordance with an illustrative embodiment.

Referring to FIG. 4, an illustrative network environment 100 is depicted for implementing the virtual workspace. Network environment 100 may include one or more clients 102(1)-102(n) (also generally referred to as local machine(s) 102, "client devices" or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 110(1)-110n (generally referred to as appliance(s) 110 or gateway(s) 110).

Although the embodiment shown in FIG. 4 shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 4, one or more appliances 110 may be located at various points or in various communication paths of network environment 100. For example, appliance 110(1) may be deployed between two networks 104(1) and 104(2), and appliances 110 may communicate with one another to work in conjunction to, for example, accelerate network traffic between clients 102 and servers 106. In other embodiments, the appliance 110 may be located on a network 104. For example, appliance 110 may be implemented as part of one of clients 102 and/or servers 106. In an embodiment, appliance 110 may be implemented as a network device such as Citrix networking (formerly NetScaler®) products sold by Citrix Systems, Inc. of Fort Lauderdale, FL.

As shown in FIG. 4, one or more servers 106 may operate as a server farm 108. Servers 106 of server farm 108 may be logically grouped, and may either be geographically co-located (e.g., on premises) or geographically dispersed (e.g., cloud based) from clients 102 and/or other servers 106. In an embodiment, server farm 108 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 4, in some embodiments, appliances 110 may include, be replaced by, or be in communication with, one or more additional appliances, such as WAN optimization appliances 112(1)-112(n), referred to generally as WAN optimization appliance(s) 112. For example, WAN optimization appliance 112 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 112 may be a performance enhancing proxy or a WAN optimization controller. In one embodiment, appliance 112 may be implemented as Citrix SD-WAN products sold by Citrix Systems, Inc. of Fort Lauderdale, FL.

Figure 5:
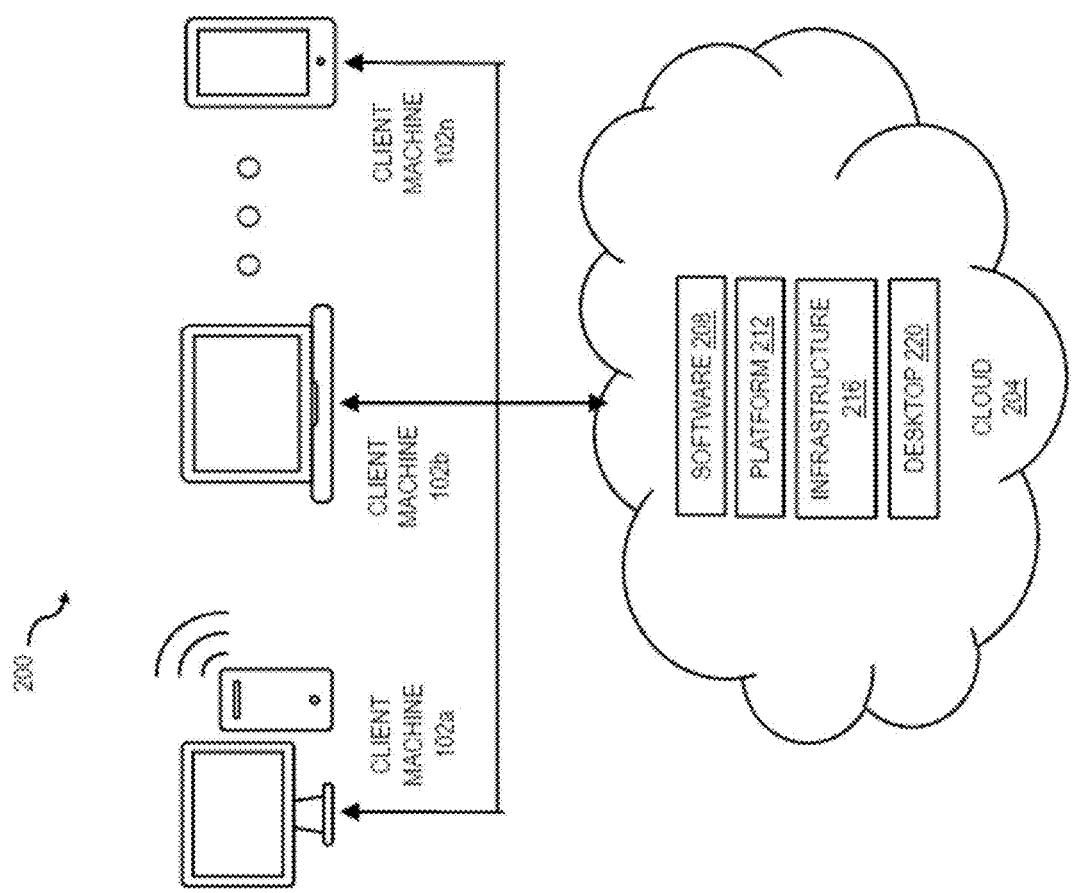
FIG. 5 depicts a cloud computing diagram, in accordance with an illustrative embodiment.

Referring to FIG. 5, a cloud computing environment 200 is depicted, which may also be referred to as a cloud environment, cloud computing or cloud network. The cloud computing environment 200 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 200, one or more clients 102a-102n (such as those described above) are in communication with a cloud network 204. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 200 may provide a private cloud serving a single organization (e.g., enterprise cloud). In another example, the cloud computing environment 200 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 200 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 200 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 200 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 200 can provide an elasticity to dynamically scale out or scale in response to different demands from one or more clients 102. In some embodiments, the cloud computing environment 200 can include or provide monitoring services to monitor, control and/or generate reports corresponding to the provided shared services and resources.

In some embodiments, the cloud computing environment 200 may provide cloud-based delivery of different types of cloud computing services, such as Software as a service (SaaS) 208, Platform as a Service (PaaS) 212, Infrastructure as a Service (IaaS) 216, and Desktop as a Service (DaaS) 220, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

In described embodiments, clients 102, servers 106, and appliances 110 and 112 may be deployed as and/or executed on any type and form of computing device, such as any desktop computer, laptop computer, or mobile device capable of communication over at least one network and performing the operations described herein. For example, clients 102, servers 106 and/or appliances 110 and 112 may each correspond to one computer, a plurality of computers, or a network of distributed computers such as computing system 300 shown in FIG. 6. Computing system 300 may for example be implemented by a cloud computing environment that employs a network of remote, hosted servers to manage, store and/or process data, and may generally be referred to, or fall under the umbrella of, a "network service."

Figure 6:
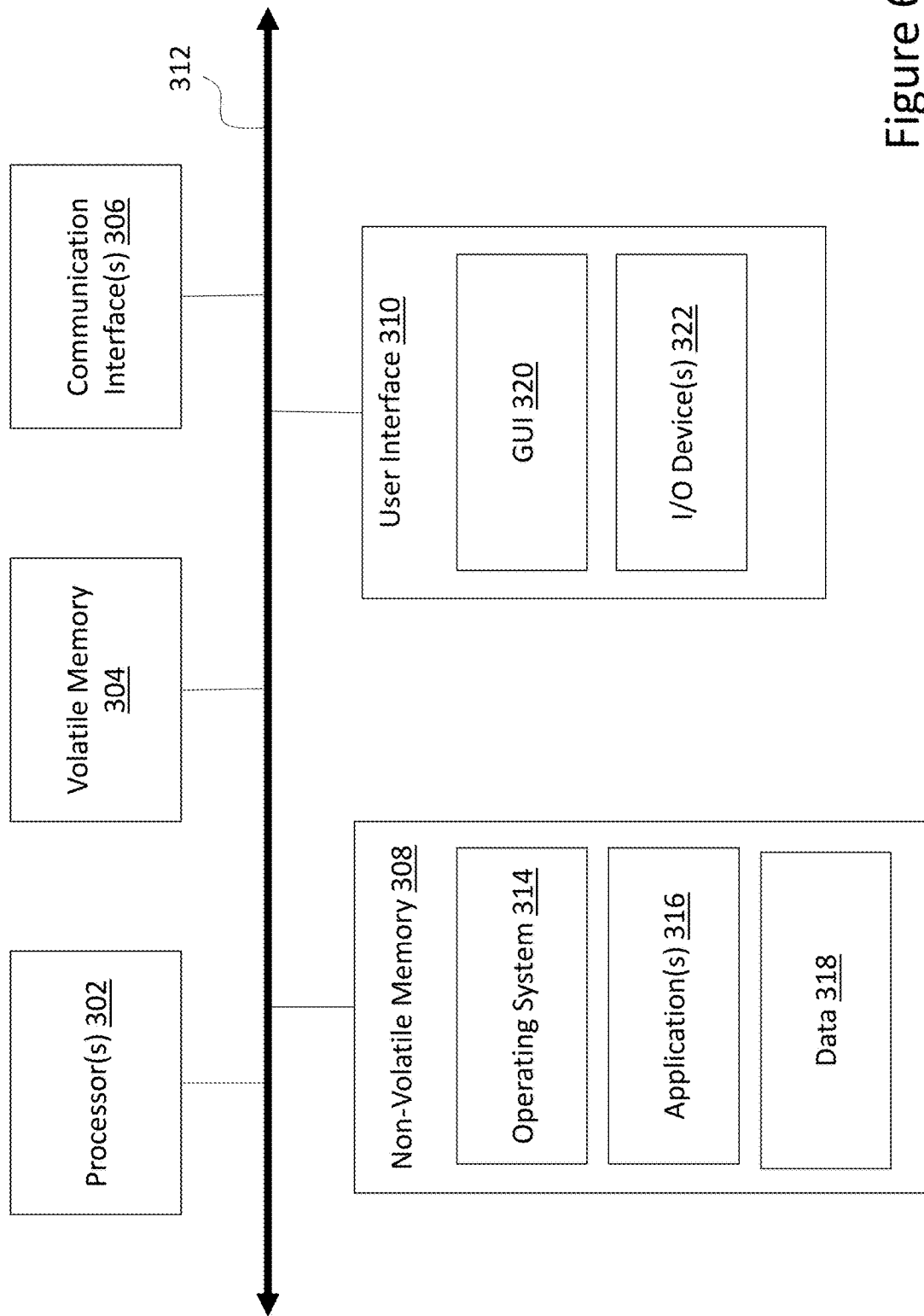
FIG. 6 depicts a computing system, in accordance with an illustrative embodiment.

Elements of the described solution may be embodied in a computing system, such as that shown in FIG. 6 in which a computer 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312.

Computer 300 as shown in FIG. 6 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

We claim:

1. An application virtualization platform, comprising:
   a memory configured to store a set of relevance rules for applications hosted by the application virtualization platform, wherein each relevance rule identifies at least two distinct applications and specifies a relevance setting between the at least two applications, wherein the at least two applications include a first application and a second application, and wherein the relevance setting defines whether the first application and the second application are compatible to run on at least one of a same session, or a same session server; and
   a processor coupled to the memory and configured to apply the set of relevance rules for applications hosted by the application virtualization platform to avoid conflict between the at least two applications, according to a method comprising:
receiving a request from a client to launch a target application hosted by the application virtualization platform; retrieving a subset of applicable relevance rules that specify the target application from the set of relevance rules; and selecting a resource for the target application based on the subset of applicable relevance rules, wherein the resource includes at least one of a session or a session server, wherein the subset of applicable relevance rules define whether the target application and a currently running application are compatible to run on the same session, and if the sessions are not compatible then the relevance rules define whether the target application and a currently running application are compatible to run on the same session server, wherein selecting the resource includes:
  i) defining a first candidate set of sessions for the target application to join that have a currently running application for which the subset of relevance rules define as eligible for the target application to join on the same session,
  ii) searching for all currently running applications that are not compatible to run on the same session as the target application and defining a second candidate set of sessions that include the currently running applications that are not compatible to run on the same session as the target application, and
  iii) returning only sessions from the first candidate set of sessions that do not include the second candidate set of sessions for the target application to join,
  if step (iii) does not return any eligible sessions for the target application to join, then:
  iv) defining a first candidate set of session servers for the target application to join that have a currently running application for which the subset of relevance rules define as eligible for the target application to join on the same session server,
  v) searching for all currently running applications that are not compatible to run on the same session server as the target application and defining a second candidate set of session servers that include the currently running applications that are not compatible to run on the same session server as the target application, and
  vi) returning only session servers from the first candidate set of session servers that do not include the second candidate set of session servers for the target application to join.

2. The platform of claim 1, wherein the relevance setting for the first application and the second application specifies one of:
  a first setting indicating that the first application and the second application are compatible to run on the same session;
  a second setting indicating that the first application and the second application are not compatible to run on the same session;
  a third setting indicating that the first application and the second application are not compatible to run on the same session but are compatible to run on the same session server; or
  a fourth setting indicating that the first application and the second application are not compatible to run on the same session and are not compatible to run on the same session server.

3. The platform of claim 1, wherein selecting the resource further includes:
  if at least one available session or session server does not exist, returning an error.

4. The platform of claim 1, wherein each relevance rule includes a rule identifier and further specifies a scope to which the relevance rule applies, wherein the scope indicates that the relevance applies only to a current user, applies to a group of users, or applies to all users.

5. The platform of claim 1, wherein the subset of applicable relevance rules enable selecting the resource for the target application to avoid conflict in running the target application and the currently running application, by eliminating resources with conflicts from eligibility.

6. The platform of claim 1, wherein the processor is further configured to receive the request from the client to retrieve all of the relevance rules that specify the target application, wherein if the target application is eligible to share an existing session with the currently running application, the processor joins the target application with the existing session.

7. A brokering system, comprising:
  a memory; and
  a processor coupled to the memory and configured to apply a set of relevance rules for applications hosted by an application virtualization platform, according to a method comprising:
    receiving a request from a client to launch a target application hosted by the application virtualization platform; retrieving a subset of applicable relevance rules from the set of relevance rules that specify the target application from a set of relevance rules, wherein each relevance rule specifies a relevance setting between a first application and a second application defining whether the first application and the second application are compatible to run on at least one of a same session, or a same session server; and selecting a resource for the target application based on the subset of applicable relevance rules to avoid conflict between the at least two applications, wherein the subset of applicable relevance rules define whether the target application and a currently running application are compatible to run on the same session, and if the sessions are not compatible then the relevance rules define whether the target application and a currently running application are compatible to run on the same session server, wherein the resource includes at least one of a session or a session server, wherein selecting the resource includes:
    receiving a request from a client to launch a target application hosted by the application virtualization platform; retrieving a subset of applicable relevance rules that specify the target application from the set of relevance rules; and selecting a resource for the target application based on the subset of applicable relevance rules, wherein the resource includes at least one of a session or a session server, wherein selecting the resource includes:
      i) defining a first candidate set of sessions for the target application to join that have a currently running application for which the subset of relevance rules define as eligible for the target application to join on the same session,
  ii) searching for all currently running applications that are not compatible to run on the same session as the target application and defining a second candidate set of sessions that include the currently running applications that are not compatible to run on the same session as the target application, and
  iii) returning only sessions from the first candidate set of sessions that do not include the second candidate set of sessions for the target application to join,
if step (iii) does not return any eligible sessions for the target application to join, then:
  iv) defining a first candidate set of session servers for the target application to join that have a currently running application for which the subset of relevance rules define as eligible for the target application to join on the same session server,
  v) searching for all currently running applications that are not compatible to run on the same session server as the target application and defining a second candidate set of session servers that include the currently running applications that are not compatible to run on the same session server as the target application, and
  vi) returning only session servers from the first candidate set of session servers that do not include the second candidate set of session servers for the target application to join.

8. The brokering system of claim 7, wherein the relevance setting for the first application and the second application specifies one of:
a first setting indicating that the first application and the second application are compatible to run on the same session;
a second setting indicating that the first application and the second application are not compatible to run on the same session;
a third setting indicating that the first application and the second application are not compatible to run on the same session but are compatible to run on the same session server; or
a fourth setting indicating that the first application and the second application are not compatible to run on the same session and are not compatible to run on the same session server.

9. The brokering system of claim 7, wherein selecting the resource further includes:
if at least one available session or session server does not exist, returning an error.

10. The brokering system of claim 7, wherein each relevance rule includes a rule identifier and further specifies a scope to which the relevance rule applies, wherein the scope indicates that the relevance applies only to a current user, applies to a group of users, or applies to all users.

11. The brokering system of claim 7, wherein the subset of applicable relevance rules enable selecting the resource for the target application to avoid conflict in running the target application and the currently running application, by eliminating resources with conflicts from eligibility.

12. The brokering system of claim 7, wherein the processor is further configured to receive the request from the client to retrieve all of the relevance rules that specify the target application, wherein if the target application is eligible to share an existing session with the currently running application, the processor joins the target application with the existing session.

13. A method for brokering resources for an application virtualization platform, comprising:
receiving a request from a client to launch a target application hosted by the application virtualization platform; retrieving a subset of applicable relevance rules that specify the target application from a set of relevance rules, wherein each relevance rule specifies a relevance setting between a first application and a second application defining whether the first application and the second application are compatible to run on at least one of a same session, or a same session server; and selecting a resource for the target application based on the subset of applicable relevance rules to avoid conflict between the at least two applications, wherein the subset of applicable relevance rules define whether the target application and a currently running application are compatible to run on the same session, and if the sessions are not compatible then the relevance rules define whether the target application and a currently running application are compatible to run on the same session server, wherein the resource includes at least one of a session or a session server, wherein selecting the resource for the target application includes:
  i) defining a first candidate set of sessions for the target application to join that have a currently running application for which the subset of relevance rules define as eligible for the target application to join on the same session,
  ii) searching for all currently running applications that are not compatible to run on the same session as the target application and defining a second candidate set of sessions that include the currently running applications that are not compatible to run on the same session as the target application, and
  iii) returning only sessions from the first candidate set of sessions that do not include the second candidate set of sessions for the target application to join,
if step (iii) does not return any eligible sessions for the target application to join, then:
  iv) defining a first candidate set of session servers for the target application to join that have a currently running application for which the subset of relevance rules define as eligible for the target application to join on the same session server,
  v) searching for all currently running applications that are not compatible to run on the same session server as the target application and defining a second candidate set of session servers that include the currently running applications that are not compatible to run on the same session server as the target application, and
  vi) returning only session servers from the first candidate set of session servers that do not include the second candidate set of session servers for the target application to join.

14. The method of claim 13, wherein the relevance setting for the first application and the second application specifies one of:
a first setting indicating that the first application and the second application are compatible to run on the same session;

a second setting indicating that the first application and the second application are not compatible to run on the same session;

a third setting indicating that the first application and the second application are not compatible to run on the same session but are compatible to run on the same session server; or a fourth setting indicating that the first application and the second application are not compatible to run on the same session and are not compatible to run on the same session server.

15. The method of claim 13, wherein selecting the resource further includes:

if at least one available session or session server does not exist, returning an error.

16. The method of claim 13, wherein each relevance rule includes a rule identifier and further specifies a scope to which the relevance rule applies, and wherein the scope indicates that the relevance applies only to a current user, applies to a group of users, or applies to all users.

17. The method of claim 13, further comprising receiving the request from the client to retrieve all of the relevance rules that specify the target application.

18. The method of claim 17, wherein if the target application is eligible to share an existing session with the currently running application, the method includes joining the target application with the existing session.

* * * * *